(No Model.)

H. RAYMOND.
CAR COUPLING.

No. 538,698. Patented May 7, 1895.

Witnesses.
J. F. Coleman
Rutherford Lyon

Inventor
Henry Raymond,
per Simon Lyon
Atty.

THE NORRIS PETERS CO., PHOTO-LITHO., WASHINGTON, D. C.

UNITED STATES PATENT OFFICE.

HENRY RAYMOND, OF KNOXVILLE, TENNESSEE.

CAR-COUPLING.

SPECIFICATION forming part of Letters Patent No. 538,698, dated May 7, 1895.

Application filed March 19, 1895. Serial No. 542,333. (No model.)

*To all whom it may concern:*

Be it known that I, HENRY RAYMOND, a citizen of the United States, residing at Knoxville, in the county of Knox and State of Tennessee, have invented certain new and useful Improvements in Car-Couplers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in car-couplers.

The invention will first be described in connection with the accompanying drawings, and then particularly pointed out in the claims.

Figure 1:
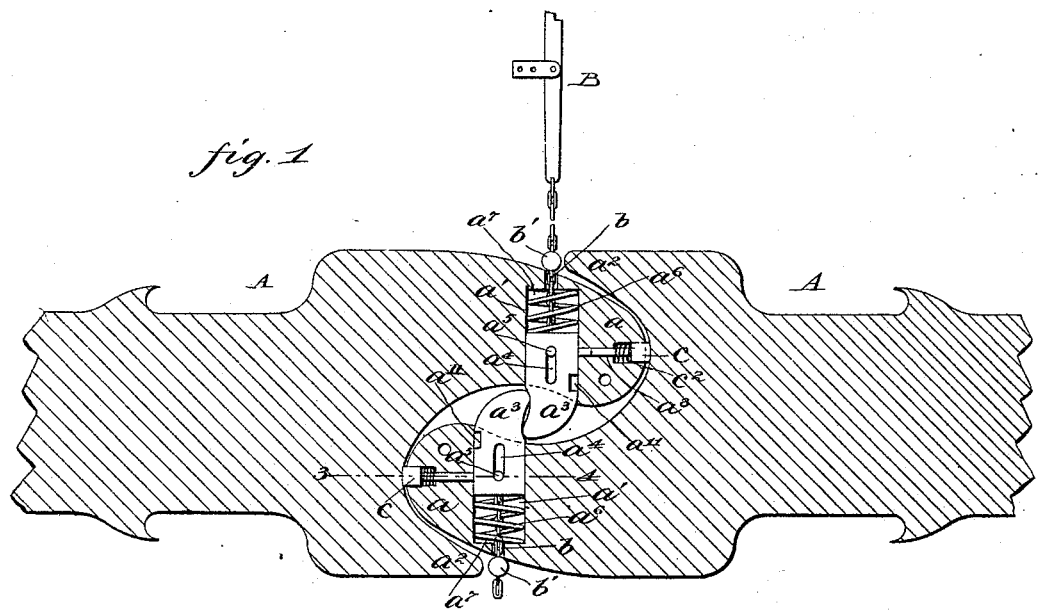
Figure 2:
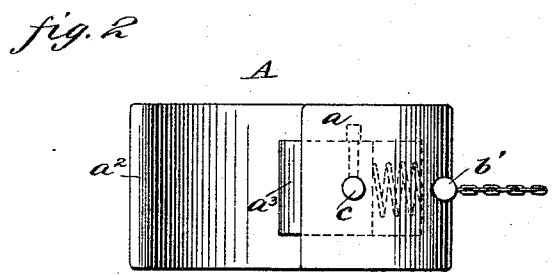
Figures 3, 4:
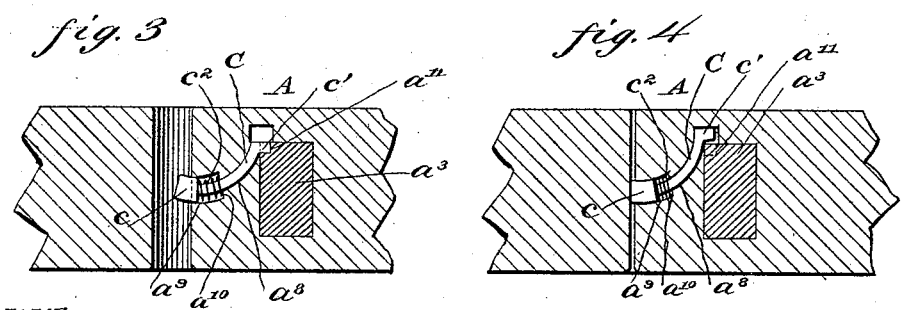

In the drawings, Figure 1 is a horizontal section through a coupling device embodying my invention. Fig. 2 is a front view of one of the coupling-jaws. Figs. 3 and 4 are detail views on line 3 4.

Referring to the drawings, A represents the jaws, which are made in any desired shape and have the long lip $a$ and the short lip $a^2$ which respectively overlap the short lip $a^2$ and the long lip $a$ of its mate or counterpart jaw. Each jaw is provided with a recess $a'$ for a pawl $a^3$ which fits snugly in the recess so far as its sides are concerned. The pawl normally projects beyond the mouth of the recess $a'$ to engage with the pawl on the other jaw when the jaws are interlocked. The pawl is provided with an opening $a^4$ through which a pin $a^5$ is passed, to limit the movement of the pawl, the said pin being secured in the body of the jaw in any suitable way. Between the pawl and inner end of the recess is placed a helical spring $a^6$, which is compressed when the pawl is forced into the recess and forces the pawl out of the recess to its normal position when the force that compressed the spring has been removed. The helical spring when compressed has approximately the same interior cross section as when expanded, and the pawl is of such length that when forced into the recess it leaves a space between it and the rear end of the recess, its inward movement being determined by the pin $a^5$ and opening $a^4$. The space $a^7$ left inside the compressed helical spring is utilized to receive a chain $b$ which connects the pawl with the operating mechanism B. The chain $b$ is provided with a button $b'$ which serves as a check or stop when the pawl is forced outward by the spring. When the pawl is forced inward, the chain coils itself in the space $a^7$ and does not actuate the pawl-operating mechanism B.

The construction thus far described is old and is shown in my Patent No. 530,055, dated November 27, 1894.

In my present invention, which is an improvement on the construction above referred to, I provide the pawl mechanism with a locking device for holding the pawls inward when drawn into that position by the pawl-operating mechanism B. This locking-device consists of a segmental or arc-shaped bolt C provided with a head $c$ and with a tooth or dog $c'$, the said bolt being located in a concentric arc-shaped recess $a^8$ formed in the longer lip $a$ of the jaw, the said recess being somewhat enlarged as at $a^9$ to permit the entrance of the head $c$ into the recess, and to receive a helical spring $c^2$ which surrounds the bolt and bears against the inner face of the head $c$ at one end and against the bottom $a^{10}$ of the enlarged portion $a^9$ of the said recess, whereby the bolt C is normally held outward, the head $c$ projecting a short distance beyond the front of the jaw, and arranged to be struck by the concaved surface of the opposite jaw, when the cars are brought together whereby the bolt C is forced inward and the spring $c^2$ compressed. The tooth or dog $c'$ enters a recess or notch $a^{11}$ formed in the bottom rear edge of the pawl, when the pawl is forced inward, whereby the pawl is locked against outward movement when the bolt is free to move outward under the influence of its spring $c^2$.

By the improvement the pawls may be drawn outward by their respective pawl-operating devices, and are automatically locked by their respective locking-devices, that is, when cars are apart. By now forcing the cars together the jaws each strike the bolts of the opposite coupler and force the same inward, whereupon the pawls are released and are forced outward by their springs, thus coupling the cars. In this way the cars may be coupled without the sudden shock and lateral strain arising when coupling the jaws with pawl devices in the usual way.

Having thus fully described my invention, what I claim as new, and desire to secure by Letters Patent, is—

1. The combination, with a jaw a pawl movable at right angles to the length of the jaw, and a spring tending to hold the pawl outward, of a locking device engaging the pawl when in its inward position and provided with a head projecting forward of the jaw and arranged to be struck by the opposite jaw whereby the locking device is released from the pawl, substantially as described.

2. The combination, with a jaw having a segmental recess at its front end, said recess lying in a vertical plane, of a pawl movable in the jaw at right angles to the length of the said jaw, means for forcing said pawl outward, a segmental bolt located in the segmental recess and provided with a head projecting beyond the jaw and with a tooth engaging the pawl when the latter is forced inward, and a spring device tending to hold the bolt outward, substantially as described.

3. The combination, with a jaw having a segmental recess enlarged at its front end, a pawl movable in the jaw at right angles to the length of the jaw, and provided with a notch on its bottom rear edge, and a spring tending to force the pawl outward of a segmental bolt located in the recess, provided with a head movable in the enlargement and projecting beyond the front of the jaw, said bolt also having a tooth arranged to enter in the pawl when the latter is forced inward, and a spring surrounding the segmental bolt and located in the enlargement of the recess in the jaw, substantially as described.

In testimony whereof I affix my signature in presence of two witnesses.

HENRY RAYMOND.

Witnesses:
   T. W. FISK,
   L. BERWANGER.